A. N. E. BOOS.
WAITER'S CONTROLLING CHECK.
APPLICATION FILED MAR. 11, 1910.
1,130,691.
Patented Mar. 2, 1915.
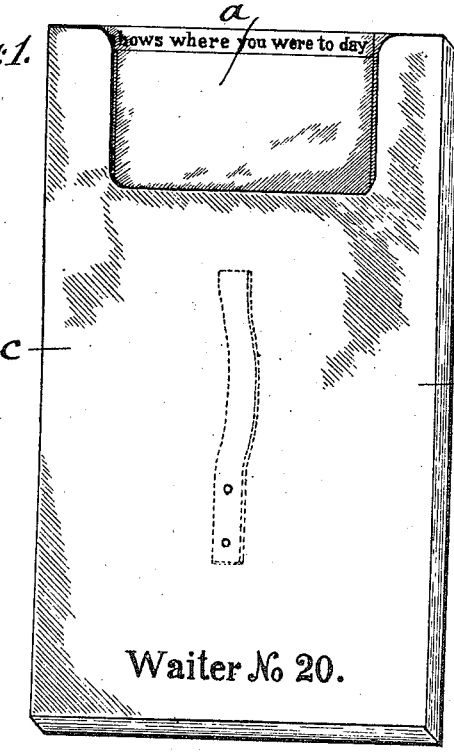
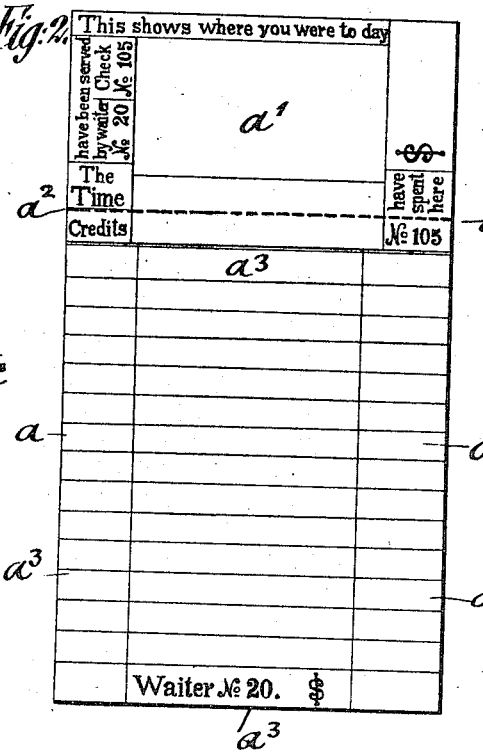
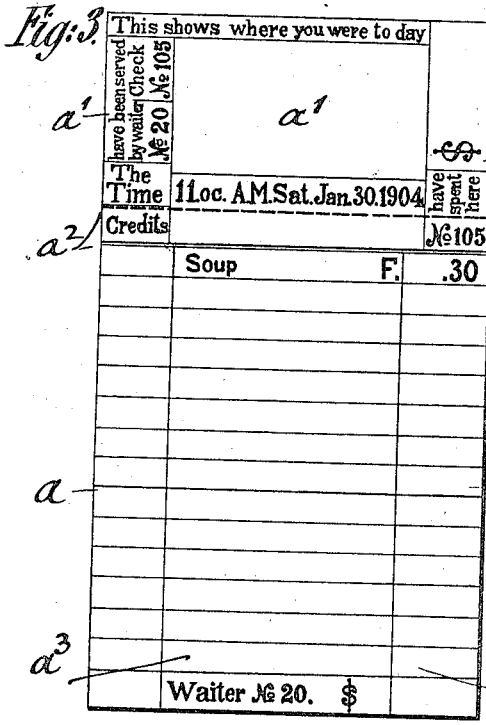
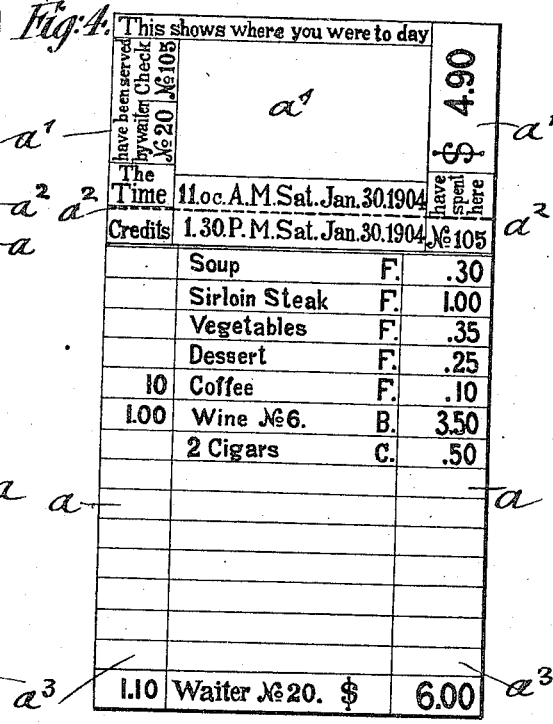
Witnesses
Ernest G. Hill
John Cranston Stewart
Inventor
August N. E. Boos
By his Attorneys

UNITED STATES PATENT OFFICE.

AUGUST N. E. BOOS, OF NEW YORK, N. Y.

WAITER'S CONTROLLING-CHECK.

1,130,691.

Specification of Letters Patent.

Patented Mar. 2, 1915.

Application filed March 11, 1910. Serial No. 548,545.

*To all whom it may concern:*

Be it known that I, AUGUST N. E. BOOS, a citizen of the Empire of Germany, residing in New York, in the borough of Manhattan, county and State of New York, have invented certain new and useful Improvements in Waiters' Controlling - Checks, of which the following is a specification.

This invention relates to an improved check to be used in hotels and restaurants where food, wine and cigars are sold, for controlling the waiters and making a full record of the kinds of goods sold with the price of the same, the total amount paid, the date and hour of the delivery of the goods and the identity of the waiter, the check being provided with a detachable coupon for delivery to the customer on which is recorded the time of service, the amount of the bill, the date, the number of the waiter, the number of the check, and the name of the hotel or restaurant, so that the customer may keep the same for future reference; and for these purposes the invention consists of a waiter's controlling check which will be fully described hereinafter and the new features of which will finally be pointed out in the claims.

In the accompanying drawings, Figure 1 represents a perspective view of the case in which the controlling checks are placed, on which case is printed the waiter's number, which number is also printed on all the checks contained in the case, Fig. 2 is a front-view of my improved controller check, showing the same before use, Fig. 3 is a front-view of the check as it appears as soon as the first order for food is given, and showing the date and time of service stamped thereon by the checker or cashier, and Fig. 4 is also a front-view of the check showing the complete record placed thereon, the letters on each order indicating the department from which the goods served were obtained, and the prices charged therefor.

Similar letters of reference indicate corresponding parts throughout the several views.

Referring to the drawings $c$ represents a case for a number of controlling checks and $a$ represents the blank for a waiter's controlling check for hotels, restaurants and other places where food, beverages, cigars, etc., are sold. The check $a$ consists of two parts, an upper part $a^1$ which is separated by a transverse creased or perforated line $a^2$ from the lower part $a^3$, which latter is lined horizontally and vertically so as to form spaces and columns, the horizontal spaces for entering the orders and the departments from which they are obtained, while the left-hand side-column indicates the places for entering the credits and the right-hand side-column the prices of the goods delivered. The upper part or coupon $a^1$ has a blank space bearing an inscription designating it for entry of the name of the place, restaurant or hotel visited, the inscription in the illustration being "This shows where you were today." This coupon also has a blank space bearing an inscription designating it for entry of the time of the customer's visit, this inscription being in the form illustrated "The time," and a blank space bearing an inscription designating it for entry of the cash disbursed on the waiter's section, this inscription in the form illustrated being "Have spent here $." This section also has spaces for designating the waiter number and the check number, these spaces bearing the inscription in the illustration, "Have been served by waiter No. Check No." The record made on the lower part $a^3$ of the check shows the goods delivered and the prices of the same, the credit, if any, the total amount, and the waiter's number. The orders are entered successively on the lower part $a^3$ of the check, together with the prices of the same and the department from which they were supplied. The different departments from which the goods are served are recognized by the initials "F" for food, "B" for bar and "C" for cigars. When the customer gets through with his meal, the total sum is placed at the lower end of the price column, and any credits placed in the credit-column at the lower end of the same. In the blank space at the upper right-hand end of the coupon the total amount of the bill to be paid is entered. When the service is completed it is indicated by a time stamp in the middle uppermost space of the lower part $a^3$. When the coupon $a^1$ is to be separated for the guest, it is severed on the dotted line $a^2$, the lower part being retained by the waiter for the proprietor, while the coupon is given to the customer and constituting a record-card for the customer's meal and an advertisement of the restaurant where the meal was taken. At the close of the meal, the totals of both the items in the price column and the items in the credit column are added both separately, and stamped in the blank space at the bottom of the check. The total of the credits is then deducted from the total amount of the prices, and the balance, which is the amount to be paid by the guest, is entered in the space at the upper right-hand end of the coupon or record-card. This amount is then paid to the cashier or to the waiter, all the transactions appearing clearly on the check and forming a full control of the waiter for the goods delivered.

The advantages of the improved waiter's controlling check are, first, that a complete record of the items from the different departments is obtained for the use of the proprietor; second, that any overcharging of the guests is prevented; and, third, that a record or advertising coupon with the name and place of business where the mail was taken is handed to and retained by the guest if desired.

This restaurant check having the guest coupon described enables persons traveling at the expense of others to provide vouchers for their restaurant expenses which can be turned in to the employer and used by him if desired for purposes of verification. Moreover it enables the traveler to preserve a record of such expenses without being at the trouble of making book entries thereof and avoids the annoyance of forgetfulness and errors.

Having thus described my invention, I claim as new and desire to secure by Letters Patent:

1. A restaurant check composed of two integral separable sections having an indicated line of severance and bearing on both sections corresponding waiter and check numbers, one section constituting a waiter's stub and having an item space, and the other section constituting a guest coupon and having a blank bearing an inscription designating it for entry of the name of the place visited, a blank bearing an inscription designating it for entry of a time of a customer's visit and a blank bearing an inscription designating it for entry of the cash disbursed on the waiter's section.

2. A restaurant check composed of two integral separable sections having an indicated line of severance and bearing on both sections corresponding waiter and check numbers, one section constituting a waiter's stub and having an item space, a price column and a credit column, and the other section constituting a guest coupon and having a blank bearing an inscription designating it for entry of the name of the place visited, a blank bearing an inscription designating it for entry of a time of a customer's visit and a blank bearing an inscription designating it for entry of the amount or balance of the cash disbursed on the waiter's section.

3. A restaurant check composed of two integral separable sections having an indicated line of severance, one section constituting a waiter's stub and having an item space, and the other section constituting a guest coupon and having a blank bearing an inscription designating it for entry of the name of the place visited, a blank bearing an inscription designating it for entry of a time of a customer's visit and a blank bearing an inscription designating it for entry of the cash disbursed on the waiter's section.

In testimony, that I claim the foregoing as my invention, I have signed my name in presence of two subscribing witnesses.

AUGUST N. E. BOOS.

Witnesses:
PAUL GOEPEL,
FANNIE FISK.